J. DOLBEER.
Machine for Counting.
No. 45,482. Patented Dec. 20, 1864.
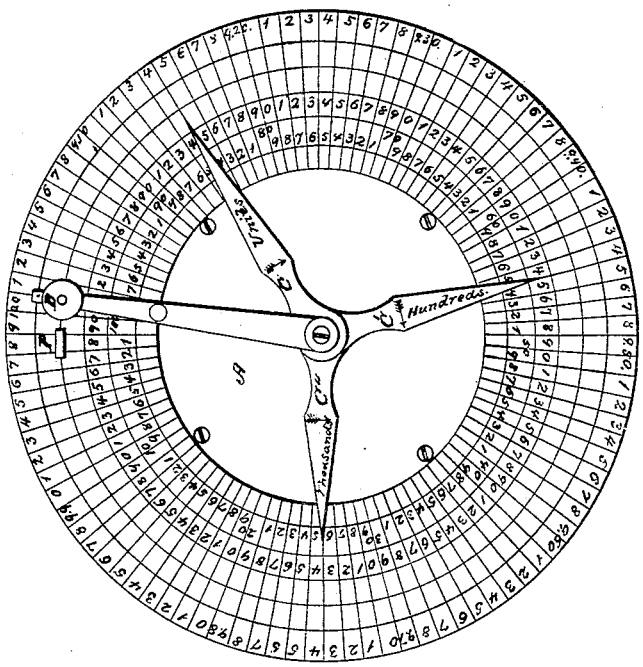
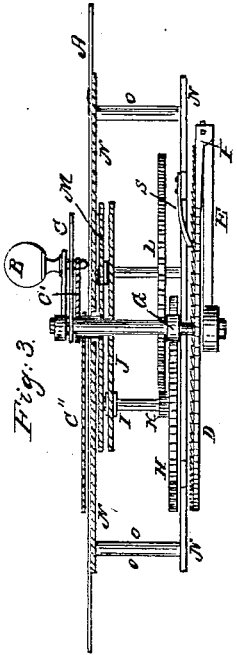
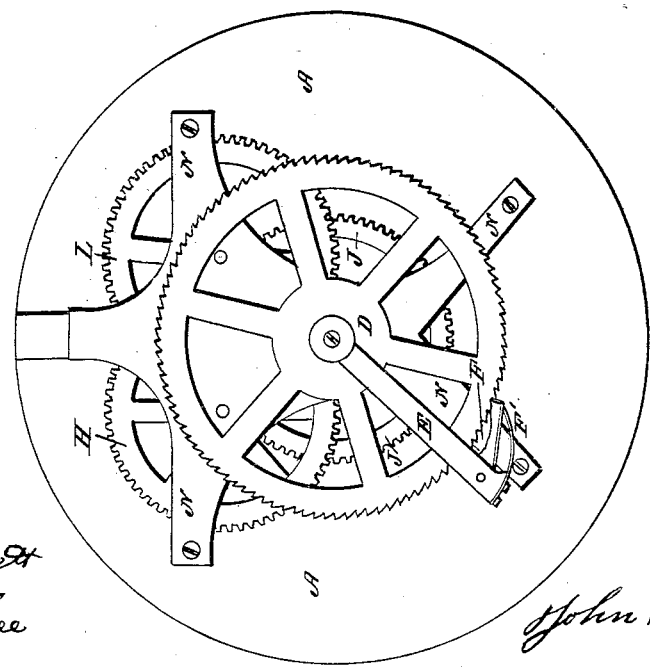
Witnesses:
Jas. F. Crosett
Wm H.C. McKee
Inventor:
John Dolbeer

UNITED STATES PATENT OFFICE.

JOHN DOLBEER, OF SAN FRANCISCO, CALIFORNIA.

IMPROVEMENT IN MACHINES FOR COUNTING.

Specification forming part of Letters Patent No. 45,482, dated December 20, 1864.

*To all whom it may concern:*

Be it known that I, JOHN DOLBEER, of San Francisco, California, have invented a new and improved machine used for keeping account of the measurement of lumber, the weight of hay, grain, and for all purposes of tallying; and I do hereby declare that the within is a full, clear, and exact description of the construction and operation of the same, reference being had to the annexed drawings, making a part of this specification, in which—

Figure 1 is a front view of the disk on which are engraved the figures, those in the outer circle showing the units, those in the fourth circle showing the hundreds, and those in the fifth circle showing the thousands. C is the index for units. C' is the index for hundreds; and C'' is the index for thousands, which moves from right to left, while those for units and hundreds move from left to right. B is the counting-arm, under which is a pin, which drops into any hole in the plate corresponding to the one hundred figures. The unit-index moves by means of a ratchet-wheel at the same rate as the counting-arm, and, being left at any point, is prevented from returning with the counting-arm by a pawl, (shown at S, Fig. 3,) which stops the wheel, but allows the counting-arm (which is on the same axis with the arm E, Fig. 2) to return. While the index C makes one complete revolution, C' moves forward one point, and while C' moves forward ten points C'' moves forward one point. Each thousand will be added by moving the counting-arm around ten times, each hundred by moving it around once, and each unit by moving it one space.

Fig. 2 represents a back view, A being the disk; N, the frame which supports the gearing. D is the ratchet-wheel, connected with the unit-index, and E the arms, connected with the counting-arm. F is the pawl which moves the wheel, and with it the unit-index. F' is a spring to keep it in place.

Fig. 3 represents a side view. B is the counting-arm, connected by an axis with the arm E, which moves the ratchet-wheel D. The unit index C is on the same axis with the wheel D, which also bears the pinion G, containing ten teeth, thus moving it forward ten teeth for one revolution of G, and moving the pinions K and I one tooth each. I moves the wheel J, (shown in section,) containing one hundred teeth and carrying the index C'. The pinion K moves the wheel L of one hundred teeth, and in one revolution moves it forward ten teeth, and its pinion W one tooth, thus moving the wheel, (also shown in section,) carrying the index C'' one tooth and the index one space, the whole operating upon the same principle as the common gas-meter.

What I claim as my invention is—

Arranging the three indexes C C' C'' to move around a common center, substantially as described, in combination with the counting-arm B, pawl S, and dial-plate A, for the purposes set forth.

JOHN DOLBEER.

Witnesses:
JAS. T. CROSETT,
WM. H. H. MCKEE.